US011955707B2

(12) United States Patent
Wu et al.

(10) Patent No.: US 11,955,707 B2
(45) Date of Patent: Apr. 9, 2024

(54) ANTENNA MODULE AND ELECTRONIC DEVICE

(71) Applicant: PEGATRON CORPORATION, Taipei (TW)

(72) Inventors: Chao-Hsu Wu, Taipei (TW); Hau Yuen Tan, Taipei (TW); Chien-Yi Wu, Taipei (TW); Shih-Keng Huang, Taipei (TW); Cheng-Hsiung Wu, Taipei (TW); Ching-Hsiang Ko, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 102 days.

(21) Appl. No.: 17/724,398

(22) Filed: Apr. 19, 2022

(65) Prior Publication Data

US 2022/0352625 A1 Nov. 3, 2022

(51) Int. Cl.
*H01Q 1/48* (2006.01)
*H01Q 1/02* (2006.01)

(52) U.S. Cl.
CPC ................. *H01Q 1/48* (2013.01); *H01Q 1/02* (2013.01)

(58) Field of Classification Search
CPC ............ H01Q 1/38; H01Q 1/48; H01Q 1/243; H01Q 1/2266; H01Q 1/2291; H01Q 5/328; H01Q 5/335; H01Q 5/371; H01Q 5/378
See application file for complete search history.

(56) References Cited

U.S. PATENT DOCUMENTS

| | | | | |
|---|---|---|---|---|
| 4,130,822 | A | 12/1978 | Conroy | |
| 7,050,010 | B2 | 5/2006 | Wang et al. | |
| 7,136,020 | B2 * | 11/2006 | Yamaki | H01Q 9/285 343/702 |
| 7,425,924 | B2 * | 9/2008 | Chung | H01Q 5/371 343/702 |
| 7,626,551 | B2 | 12/2009 | Chien et al. | |
| 8,965,303 | B2 * | 2/2015 | Yang | H04B 1/006 455/77 |
| 8,988,292 | B2 * | 3/2015 | Hotta | H01Q 9/42 343/702 |
| 2012/0194390 | A1 | 8/2012 | Endo et al. | |
| 2013/0234911 | A1 * | 9/2013 | Lee | H01Q 1/521 343/893 |
| 2014/0361948 | A1 * | 12/2014 | Tanaka | H01Q 1/243 343/861 |
| 2019/0356045 | A1 * | 11/2019 | Yu | H01Q 1/38 |

* cited by examiner

*Primary Examiner* — Tung X Le
(74) *Attorney, Agent, or Firm* — J.C. PATENTS

(57) ABSTRACT

An antenna module includes first to third radiators and a ground radiator. The first radiator includes first and second sections and excites at a first frequency band. An extension direction of the first section, including a feeding end, is not parallel to an extension direction of the second section. The second radiator includes third and fourth sections. The third section extends from an intersection of the first and second sections. The third section excites at a second frequency band. The third radiator is disposed beside the first radiator and away from the second radiator. The ground radiator is disposed on one side of the first, second, and third radiators, and includes a ground end. The fourth section of the second radiator is connected to the third section and the ground radiator. The third radiator is connected to the ground end.

10 Claims, 5 Drawing Sheets

ANTENNA MODULE AND ELECTRONIC DEVICE

CROSS-REFERENCE TO RELATED APPLICATION

This application claims the priority benefit of Taiwanese application no. 110115951, filed on May 3, 2021. The entirety of the above-mentioned patent application is hereby incorporated by reference herein and made a part of this specification.

BACKGROUND

Technology Field

The disclosure relates to an antenna module and an electronic device, and in particular, to a multi-band antenna module and an electronic device adopting the antenna module.

Description of Related Art

Generally, a ground end of a conventional antenna in an electronic device is directly bonded to a metal back lid through copper foil for a connection with a system ground.

However, since the performance of the electronic device is advanced, so the electronic device tends to get overheated easily. Hence, it has to be cooled down through a fan inside the device to blow out hot air. Therefore, how to arrange the elements such as the antenna ground end in the electronic device and achieve system grounding without affecting heat dissipation and how to provide a well-performing multi-band antenna module are the current direction of exploration.

SUMMARY

The disclosure is directed to an antenna module exhibiting a favorable multi-band characteristic.

The disclosure provides an electronic device adopting the antenna module exhibiting high heat dissipation.

The antenna module of the disclosure includes a first radiator, a second radiator, a third radiator, and a ground radiator. The first radiator includes a first section and a second section. The first section includes a feeding end, and the first radiator excites at a first frequency band. The first section is connected to the second section, and an extension direction of the first section intersects and is not parallel to an extension direction of the second section. The second radiator includes a third section and a fourth section. The third section extends from an intersection of the first section and the second section in a direction against the extension direction of the second section, and the third section excites at a second frequency band. The third radiator is disposed beside the first radiator and away from the second radiator. The ground radiator is disposed on one side of the first radiator, the second radiator, and the third radiator and includes a ground end. The fourth section of the second radiator is connected to the third section and the ground radiator, and the third radiator is connected to the ground end.

In an embodiment of the disclosure, a U-shaped slot is formed among the first radiator, the third radiator, the ground radiator, and the fourth section.

In an embodiment of the disclosure, the third radiator includes a fifth section, a sixth section, and a seventh section which are sequentially connected and form a U-shaped structure with an opening facing away from the first radiator. The fifth section and the sixth section intersect at the ground end. The sixth section is located beside an end of the second section, and the end is away from the third section.

In an embodiment of the disclosure, a distance between the sixth section and the end of the second section ranges from 0.5 mm to 2 mm.

In an embodiment of the disclosure, an extension direction of the ground radiator is parallel to the extension direction of the second section and an extension direction of the third section.

The electronic device of the disclosure includes a housing, a fan, a first heat dissipation member, a second heat dissipation member, at least one first conductive member, the antenna module, and a second conductive member. The housing includes a heat dissipation opening. The fan is disposed in the housing and includes a first surface, a second surface opposite to the first surface, and a vent located between the first surface and the second surface. The vent is disposed corresponding to the heat dissipation opening. The first heat dissipation member extends from the first surface of the fan toward the heat dissipation opening. The second heat dissipation member extends from the second surface of the fan toward the heat dissipation opening. The at least one first conductive member is disposed away from the heat dissipation opening and is connected to the first heat dissipation member and the second heat dissipation member. The antenna module is disposed in the housing and close to the heat dissipation opening. The second conductive member is connected to the antenna module and the first heat dissipation member. The antenna module, the second conductive member, the first heat dissipation member, the at least one first conductive member, and the second heat dissipation member form a loop.

In an embodiment of the disclosure, a material of the housing is a conductor. The second heat dissipation member is connected to the housing.

In an embodiment of the disclosure, the electronic device further includes a screen and a third conductive member. The screen is exposed out of the housing. The third conductive member is connected to the second conductive member and the screen.

In an embodiment of the disclosure, the second conductive member is located outside a space between the first heat dissipation member and the second heat dissipation member. Air generated by the fan comes out from the vent and travels through the space between the first heat dissipation member and the second heat dissipation member and the heat dissipation opening and then leaves the housing.

In an embodiment of the disclosure, the at least one first conductive member includes multiple first conductive members. The fan is located between the first surface and the second surface and includes a third surface and a fourth surface adjacent to each other. The first conductive members are disposed on the third surface and the fourth surface.

Based on the above, the first radiator of the antenna module of the disclosure includes the first section and the second section which are connected. The third section of the second radiator extends from the intersection of the first section and the second section in the direction against the extension direction of the second section. The third radiator is disposed beside the first radiator and is away from the second radiator. The ground radiator is disposed on one side of the first radiator, the second radiator, and the third radiator. The fourth section of the second radiator is connected to the third section and the ground radiator, and the third radiator is connected to the ground end. With the design above, the antenna module of the disclosure may excite at the first frequency band and the second frequency band and exhibit a favorable performance. In addition, the first heat dissipation member of the electronic device of the disclosure extends from the first surface of the fan toward the heat dissipation opening, and the second heat dissipation member extends from the second surface of the fan toward the heat dissipation opening. The first conductive member is disposed away from the heat dissipation opening and is connected to the first heat dissipation member and the second heat dissipation member. The second conductive member is connected to the antenna module and the first heat dissipation member. Therefore, the ground radiator of the antenna module, the second conductive member, the first heat dissipation member, the first conductive member, and the second heat dissipation member form the loop and exhibit an enhanced ground effect. Furthermore, the ground path is away from a space between the vent and the heat dissipation opening so that the electronic device exhibits the favorable heat dissipation performance.

DESCRIPTION OF THE EMBODIMENTS

Figure 1:
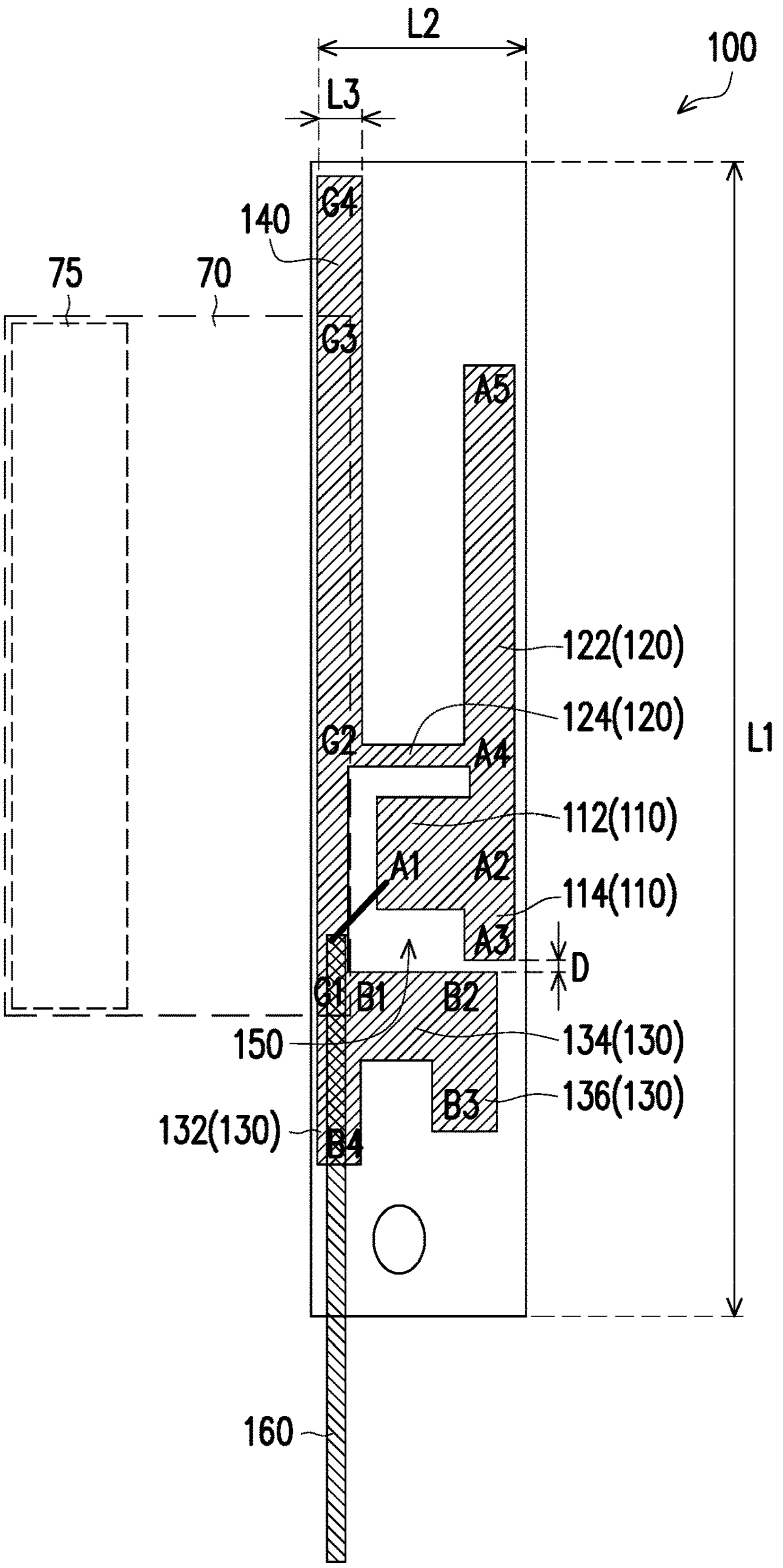
FIG. 1 is a schematic diagram of an antenna module according to an embodiment of the disclosure.

FIG. 1 is a schematic diagram of an antenna module according to an embodiment of the disclosure. Referring to FIG. 1, an antenna module 100 of the embodiment includes a first radiator 110 (position A1 to position A3), a second radiator 120 (position A4 to position A5 and the position A4 to position G2), a third radiator 130 (position B1 to position B4), and a ground radiator 140 (position G1 to position G4).

Specifically, the first radiator 110 (the position A1 to the position A3) includes a first section 112 (the position A1 to the position A2) and a second section 114 (the position A2 to the position A3). The first section 112 is connected to the second section 114, and an extension direction of the first section 112 is not parallel to an extension direction of the second section 114. The first section 112 includes a feeding end (the position A1), and the first radiator 110 excites at a first frequency band. In the embodiment, the first frequency band is, for example, a frequency band of WiFi 5G.

The second radiator 120 (the position A4 to the position A5 and the position A4 to the position G2) includes a third section 122 (the position A2, the position A4, and the position A5) and a fourth section 124 (the position A4 to the position G2). The third section 122 (the position A2, the position A4, and the position A5) extends from an intersection (i.e. the position A2) of the first section 112 and the second section 114 in a direction against the extension direction of the second section 114 (the position A2 to the position A3).

The third section 122 excites at a second frequency band. In the embodiment, the second frequency band is, for example, a frequency band of WiFi 2.4 G. In addition, in the embodiment, a length or a width of the third section 122 (the position A4 to the position A5) may be adjusted to adjust a central frequency of WiFi 2.4 GHz.

The third radiator 130 (the position B1 to the position B4) is disposed beside the first radiator 110 and away from the second radiator 120. The third radiator 130 (the position B1 to the position B4) includes a fifth section 132 (the position B4 to the position B1), a sixth section 134 (the position B1 to the position B2), and a seventh section 136 (position B2 to position B3) which are sequentially connected and form a U-shaped structure with an opening facing away from the first radiator 110.

In the embodiment, the second section 114 of the first radiator 110 has an end (the position A3) away from the third section 122, and the sixth section 134 (the position B1 to the position B2) is located beside the end (the position A3) of the second section 114 (the position A2 to the position A3). A distance D between the sixth section 134 (the position B2) and the end (the position A3) of the second section 114 ranges from 0.5 mm to 2 mm, such as 1 mm.

A length or a width of the third radiator 130 (the position B1 to the position B4), especially a length or a width of the sixth section 134 (the position B1 to the position B2) may be adjusted to adjust a central frequency of WiFi 5 GHz.

The ground radiator 140 (the position G1 to the position G4) is disposed on one side of the first radiator 110 (the position A1 to the position A3), the second radiator 120 (the position A2, the position A4, and the position A5 and the position A4 to the position G2), and the third radiator 130 (the position B1 to the position B4). An extension direction of the ground radiator 140 (the position G1 to the position G4) is parallel to the extension direction of the second section 114 (the position A2 to the position A3) and an extension direction of the third section 122 (the position A2, the position A4, and the position A5). The fourth section 124 of the second radiator 120 is connected to a portion of the third section 122 located at the position A4 and a portion of the ground radiator 140 located at the position G2.

The ground radiator 140 (the position G1 to the position G4) includes a ground end (the position G1). The third radiator 130 is connected to the ground end (the position G1). Specifically, the fifth section 132 and the sixth section 134 of the third radiator 130 intersect at the ground end (the position G1) at the position B1.

In the embodiment, the feeding end (the position A1) of the antenna module 100 is connected to a positive end of a coaxial transmission cable 160 and is connected to a radio frequency signal source (not shown) through the coaxial transmission cable 160. The ground end (the position G1) is connected to a negative end of the coaxial transmission cable 160 and is connected to a system ground plane (not shown) through the coaxial transmission cable 160.

As shown in FIG. 1, a U-shaped slot 150 is formed among the first radiator 110 (the position A1 to the position A3), the sixth section 134 (the position B1 to the position B2) of the third radiator 130, a portion of the ground radiator 140 located at the position G1 to the position G2, and the fourth section 124 (the position A4 to the position G2). The U-shaped slot may adjust or control impedance matching at WiFi 2.4 GHz and WiFi 5 GHz.

Therefore, the antenna module 100 of the disclosure exhibits a favorable WiFi dual band antenna characteristic through a combination of a PIFA totem (the first radiator 110) at low frequency WiFi 2.4 GHz and an open-loop totem (the second radiator 120 and the third radiator 130) at high frequency WiFi 5 GHz.

In addition, a size of the antenna module 100 of the embodiment is small so that the antenna module 100 may be disposed on a substrate with a length L1 of, for example, 40 mm and a width L2 of, for example, 7.25 mm. A width L3 of the ground radiator 140 is approximately 1.5 mm. Therefore, the antenna module 100 of the embodiment may be applied to a tablet computer with a narrow frame.

Figure 2:
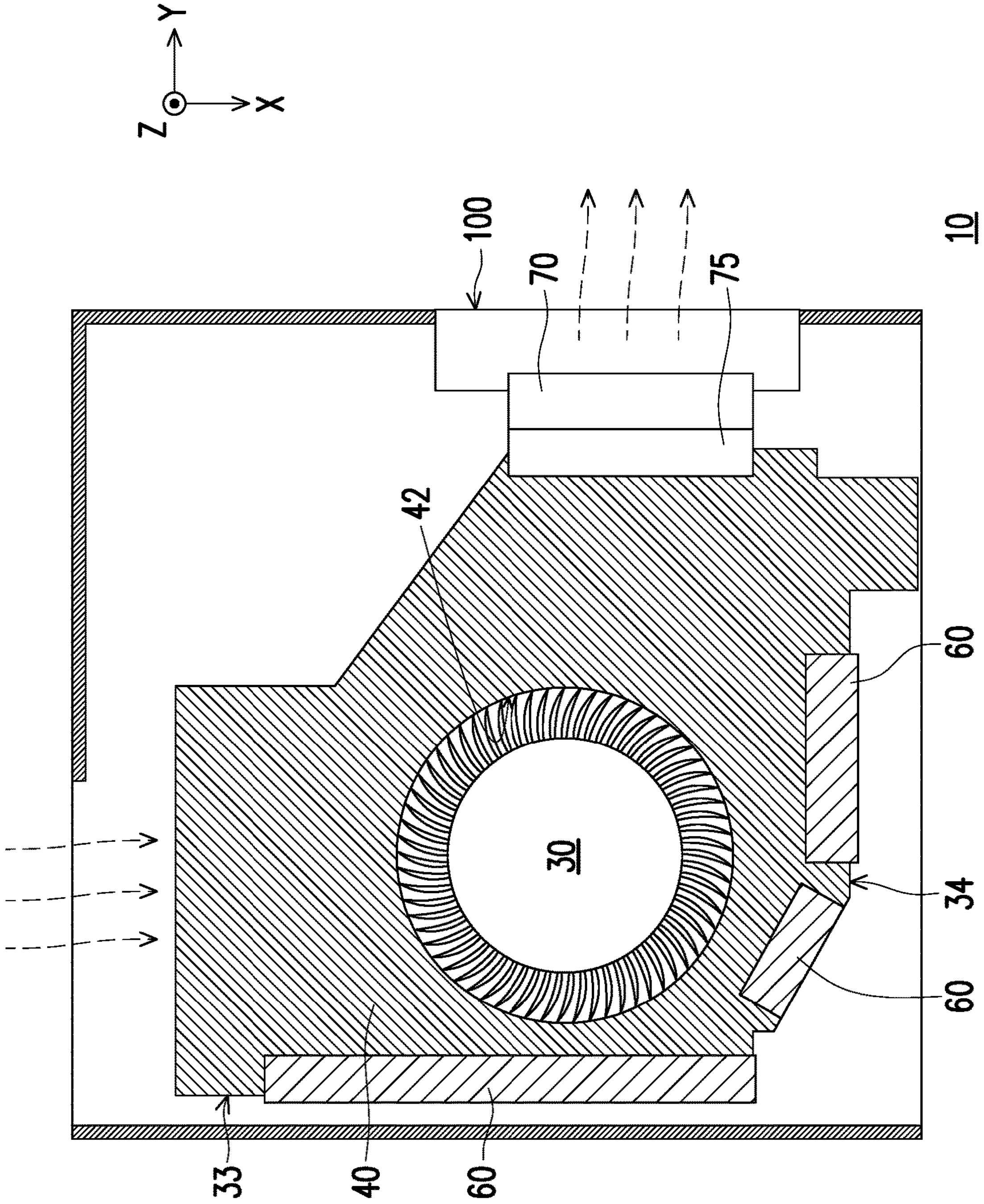
FIG. 2 is a top view of a partial structure inside an electronic device according to an embodiment of the disclosure.
Figure 3:
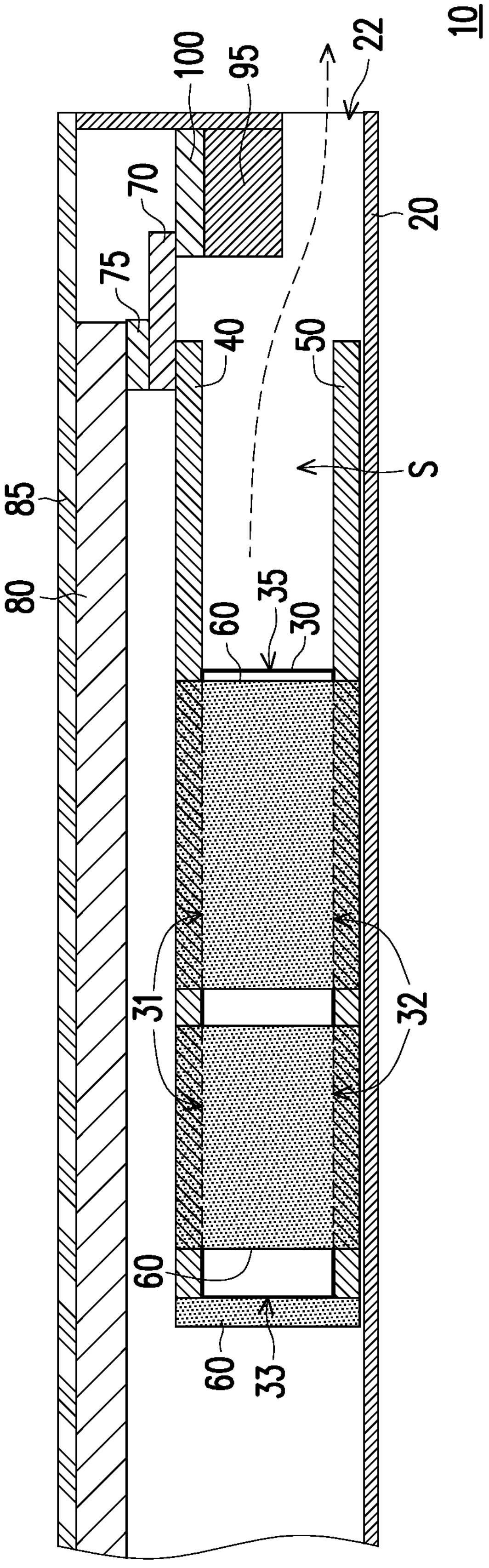
FIG. 3 is a schematic cross-sectional diagram of the partial structure of the electronic device of FIG. 2.

FIG. 2 is a top view of a partial structure inside an electronic device according to an embodiment of the disclosure. FIG. 3 is a schematic cross-sectional diagram of the partial structure of an electronic device 10 of FIG. 2. Referring to FIG. 2 and FIG. 3, the electronic device 10 of the embodiment is a tablet computer; however, the disclosure is not limited thereto. The electronic device 10 includes a housing 20 (as shown in FIG. 3), a fan 30, a first heat dissipation member 40, a second heat dissipation member 50 (as shown in FIG. 3), at least one first conductive member 60, the antenna module 100 of FIG. 1, and a second conductive member 70. Note that FIG. 2 mainly illustrates a relation of positions of the elements. For the detailed features of the antenna module 100, FIG. 1 may be referred to.

As shown in FIG. 3, the housing 20 includes a heat dissipation opening 22. The fan 30 is disposed in the housing 20 and includes a first surface 31 (an upper surface), a second surface 32 (a lower surface) opposite to the first surface 31, and a vent 35 located between the first surface 31 and the second surface 32. The vent 35 of the fan 30 is disposed corresponding to the heat dissipation opening 22 of the housing 20.

The first heat dissipation member 40 is attached to the first surface 31 (the upper surface) of the fan 30 and extends from the first surface 31 of the fan 30 toward the heat dissipation opening 22. As shown in FIG. 2, the first heat dissipation member 40 has a hole 42 which exposes a fan blade of the fan 30.

In addition, as shown in FIG. 3, the second heat dissipation member 50 is attached to the second surface 32 (the lower surface) of the fan 30 and extends from the second surface 32 of the fan 30 toward the heat dissipation opening 22. The first heat dissipation member 40 and the second heat dissipation member 50 are, for example, copper foil; however, the disclosure is not limited thereto.

As shown in FIG. 3, the at least one first conductive member 60 is disposed away from the heat dissipation opening 22 and is connected to the first heat dissipation member 40 and the second heat dissipation member 50. In the embodiment, there is a plurality of the first conductive members 60. As shown in FIG. 2, the fan 30 is located between the first surface 31 and the second surface 32 and includes a third surface 33 (a side surface) and a fourth surface 34 (the other side surface of FIG. 2) adjacent to each other. The first conductive members 60 are disposed on the third surface 33 and the fourth surface 34 and are connected to the first heat dissipation member 40 and the second heat dissipation member 50 located above and below. In addition, in an embodiment, a material of the housing 20 is a conductor. The second heat dissipation member 50 is connected to the housing 20.

As shown in FIG. 3, the antenna module 100 is disposed in the housing 20 and near the heat dissipation opening 22. In the embodiment, the antenna module 100 is disposed on a bracket 95. A material of the bracket 95 is an insulating material, such as plastic. The bracket 95 is disposed above the heat dissipation opening 22. The second conductive member 70 is connected to the antenna module 100 and the heat dissipation member 40. As shown in FIG. 1, the second conductive member 70 is connected to the ground radiator 140 of the antenna module 100. The second conductive member 70 is, for example, aluminum foil; however, the disclosure is not limited thereto.

Returning to FIG. 3, in the embodiment, the ground radiator 140 (shown in FIG. 1) of the antenna module 100 may form a loop sequentially with the second conductive member 70, the first heat dissipation member 40, the first conductive members 60, the second heat dissipation member 50, and the housing 20 and achieve complete system grounding.

In addition, in the embodiment, the electronic device 10 further includes a screen 80 and a third conductive member 75. The third conductive member 75 is, for example, conductive foam; however, the disclosure is not limited thereto. The screen 80 is exposed out of the housing 20 and is covered by glass 85. The third conductive member 75 is connected to the second conductive member 70 and the screen 80. Therefore, the ground radiator 140 (shown in FIG. 1) of the antenna module 100 may form another loop sequentially with the second conductive member 70, the third conductive member 75, and metal of the screen 80 and achieve double grounding.

Furthermore, as clearly shown in FIG. 3, the second conductive member 70 and the first conductive member 60 are located outside a space S between the first heat dissipation member 40 and the second heat dissipation member 50. Specifically, the second conductive member 70 is located above the first heat dissipation member 40, and the first conductive member 60 is located on the third surface 33 and the fourth surface 34 of the fan 30. Hence, a lateral surface where the vent 35 is located may be not blocked, having less impact on air flowing out.

Since the space S between the first heat dissipation member 40 and the second heat dissipation member 50 is not blocked by any element, the air generated by the fan 30 comes out from the vent 35 and travels through the space S between the first heat dissipation member 40 and the second heat dissipation member 50 and the heat dissipation opening 22 and then leaves the housing 20. In other words, a ground path of the antenna module 100 does not affect a heat dissipation path so that the electronic device 10 may exhibit a favorable heat dissipation performance.

In addition, since the ground path includes the first heat dissipation member 40 and the second heat dissipation member 50, other elements in the ground path may help the first heat dissipation member 40 and the second heat dissipation member 50 for cooling and further enhance the heat dissipation performance.

Figure 4:
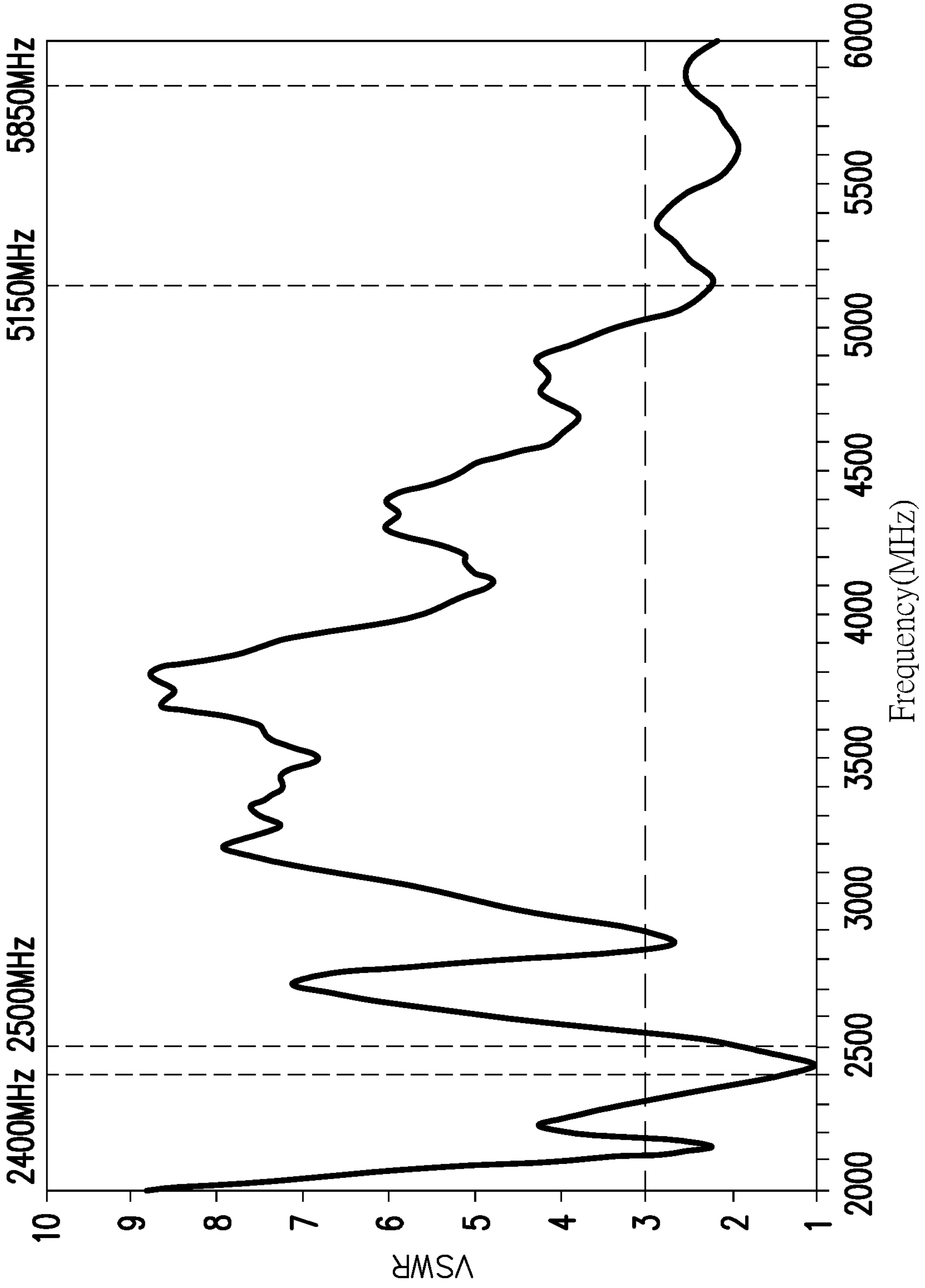
FIG. 4 is a plot of a frequency vs. VSWR for the antenna module in FIG. 1.

FIG. 4 is a plot of frequency vs. VSWR for the antenna module in FIG. 1. Referring to FIG. 4, the VSWR of the antenna module 100 at WiFi 2.4 GHz and WiFi 5 GHz may be below 3 so that a favorable performance is provided.

Figure 5:
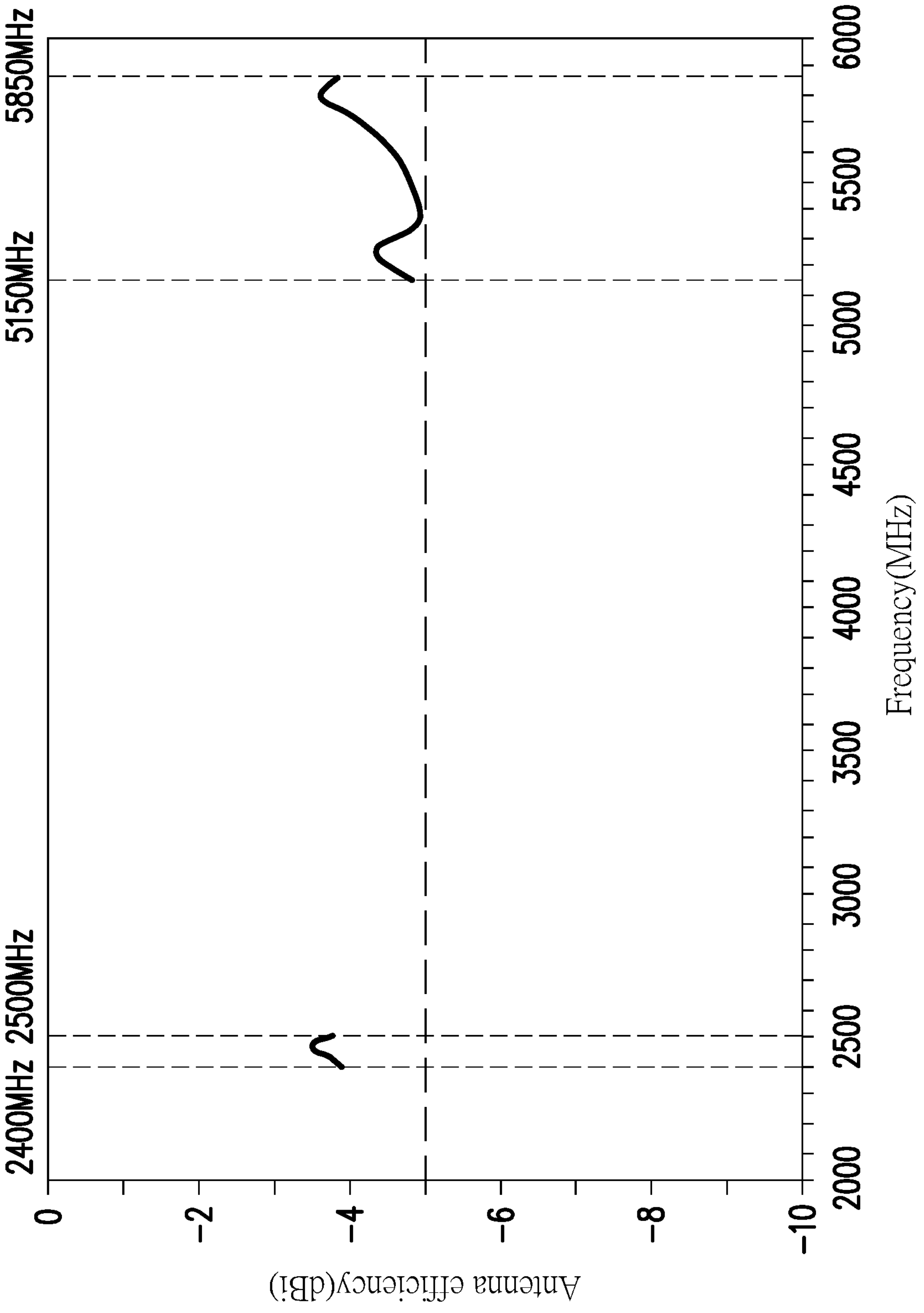
FIG. 5 is a plot of a frequency vs. antenna efficiency for the antenna module in FIG. 1.

FIG. 5 is a plot of frequency vs. antenna efficiency for the antenna module in FIG. 1. Referring to FIG. 5, the antenna efficiency of the antenna module 100 at low frequency WiFi 2.4 GHz may be greater than −4 dBi and the antenna efficiency of the antenna module 100 at high frequency WiFi 5 GHz may be greater than −5 dBi so that the favorable performance is provided.

In summary of the above, the first radiator of the antenna module of the disclosure includes the first section and the second section which are connected and form a bend. The third section of the second radiator extends from the intersection of the first section and the second section in a direction against the extension direction of the second section. The third radiator is disposed beside the first radiator and is away from the second radiator. The ground radiator is disposed on one side of the first radiator, the second radiator, and the third radiator. The fourth section of the second radiator is connected to the third section and the ground radiator, and the third radiator is connected to the ground end. With the design above, the antenna module of the disclosure may excite at the first frequency band and the second frequency band and exhibit a favorable performance. In addition, the first heat dissipation member of the electronic device of the disclosure extends from the first surface of the fan to the heat dissipation opening, and the second heat dissipation member extends from the second surface of the fan to the heat dissipation opening. The first conductive member is disposed away from the heat dissipation opening and is connected to the first heat dissipation member and the second heat dissipation member. The second conductive member is connected to the antenna module and the first conductive member. Therefore, the ground radiator of the antenna module, the second conductive member, the first heat dissipation member, the first conductive member, and the second heat dissipation member form the loop and exhibit an enhanced ground effect. Furthermore, the ground path is away from a space between the vent and the heat dissipation opening so that the electronic device exhibits the favorable heat dissipation performance.

What is claimed is:

1. An antenna module, comprising:

a first radiator comprising a first section and a second section, wherein the first section comprises a feeding end, the first radiator excites at a first frequency band, the first section is connected to the second section, and an extension direction of the first section is not parallel to an extension direction of the second section;

a second radiator comprising a third section and a fourth section, wherein the third section extends from an intersection of the first section and the second section in a direction against the extension direction of the second section, and the third section excites at a second frequency band;

a third radiator disposed beside the first radiator and away from the second radiator; and a ground radiator disposed on one side of the first radiator, the second radiator, and the third radiator and comprising a ground end, wherein the fourth section of the second radiator is connected to the third section and the ground radiator, and the third radiator is connected to the ground end.

2. The antenna module according to claim 1, wherein a U-shaped slot is formed among the first radiator, the third radiator, the ground radiator, and the fourth section.

3. The antenna module according to claim 1, wherein the third radiator comprises a fifth section, a sixth section, and a seventh section which are sequentially connected and form a U-shaped structure with an opening facing away from the first radiator, the fifth section and the sixth section intersect at the ground end, the sixth section is located beside an end of the second section, and the end is away from the third section.

4. The antenna module according to claim 3, wherein a distance between the sixth section and the end of the second section ranges from 0.5 mm to 2 mm.

5. The antenna module according to claim 1, wherein an extension direction of the ground radiator is parallel to the extension direction of the second section and an extension direction of the third section.

6. An electronic device, comprising:

a housing comprising a heat dissipation opening;

a fan disposed in the housing and comprising a first surface, a second surface opposite to the first surface, and a vent located between the first surface and the second surface, wherein the vent is disposed corresponding to the heat dissipation opening;

a first heat dissipation member extending from the first surface of the fan toward the heat dissipation opening;

a second heat dissipation member extending from the second surface of the fan toward the heat dissipation opening;

at least one first conductive member disposed away from the heat dissipation opening and connected to the first heat dissipation member and the second heat dissipation member;

the antenna module according to claim 1 disposed in the housing and close to the heat dissipation opening; and a second conductive member connected to the antenna module and the first heat dissipation member, wherein the ground radiator of the antenna module, the second conductive member, the first heat dissipation member, the at least one first conductive member, and the second heat dissipation member form a loop.

7. The electronic device according to claim 6, wherein a material of the housing is a conductor, and the second heat dissipation member is connected to the housing.

8. The electronic device according to claim 6, further comprising:

a screen exposed out of the housing; and a third conductive member connected to the second conductive member and the screen.

9. The electronic device according to claim 6, wherein the second conductive member is located outside a space between the first heat dissipation member and the second heat dissipation member, air generated by the fan comes out from the vent and travels through the space between the first heat dissipation member and the second heat dissipation member and the heat dissipation opening and then leaves the housing.

10. The electronic device according to claim 6, wherein the at least one first conductive member comprises a plurality of first conductive members, the fan comprises a third surface and a fourth surface adjacent to each other and located between the first surface and the second surface, and the first conductive members are disposed on the third surface and the fourth surface.

* * * * *